(12) United States Patent
Thierjung et al.

(10) Patent No.: US 7,931,464 B2
(45) Date of Patent: Apr. 26, 2011

(54) APPARATUS FOR EXTRUSION-BLOW MOLDING A BOTTLE FOR ASSEMBLY WITH METAL CAN END

(75) Inventors: George A. Thierjung, Broomfield, CO (US); Michael D. Richardson, Superior, CO (US); Jason M. Kaanta, Pine, CO (US)

(73) Assignee: Ball Corporation, Broomfield, CO (US)

( * ) Notice: Subject to any disclaimer, the term of this patent is extended or adjusted under 35 U.S.C. 154(b) by 550 days.

(21) Appl. No.: 12/099,835

(22) Filed: Apr. 9, 2008

(65) Prior Publication Data
US 2009/0258105 A1  Oct. 15, 2009

(51) Int. Cl.
*B29C 49/50* (2006.01)
*B29C 49/62* (2006.01)

(52) U.S. Cl. ......... 425/525; 425/527; 425/531; 425/812

(58) Field of Classification Search ........... 425/525, 425/527, 531, 812; *B29C 49/50, 49/62*
See application file for complete search history.

(56) References Cited

U.S. PATENT DOCUMENTS

| | | | | |
|---|---|---|---|---|
| 3,545,040 | A | * | 12/1970 | Mehnert ............... 425/150 |
| 3,752,627 | A | * | 8/1973 | Bourgeois et al. ...... 425/298 |
| 4,496,064 | A | | 1/1985 | Beck et al. ............... 215/1 |
| 4,576,843 | A | | 3/1986 | Beck et al. ............... 428/35 |
| 4,894,268 | A | | 1/1990 | Greenwood et al. .... 428/36.42 |
| 5,217,729 | A | | 6/1993 | Terauchi et al. ......... 425/522 |
| 5,342,663 | A | | 8/1994 | Yokobayashi ........... 428/35.7 |
| D356,160 | S | | 3/1995 | Cautereels ............... D24/197 |
| D403,963 | S | | 1/1999 | Ramsey .................. D9/500 |
| D408,221 | S | | 4/1999 | Asberg ................... D7/511 |
| D437,229 | S | | 2/2001 | Andrew .................. D9/516 |
| D437,230 | S | | 2/2001 | Andrew .................. D9/516 |
| D445,337 | S | | 7/2001 | Croft et al. ............. D9/504 |
| D447,418 | S | | 9/2001 | Bezek et al. ............ D9/504 |
| D452,954 | S | | 1/2002 | Westphal ................ D9/500 |
| 6,422,414 | B1 | | 7/2002 | Nakamura et al. ...... 220/669 |

(Continued)

FOREIGN PATENT DOCUMENTS
DE  7123441.8  10/1971

(Continued)

*Primary Examiner* — Robert B Davis
(74) *Attorney, Agent, or Firm* — Brinks Hofer Gilson & Lione (57) ABSTRACT

An extrusion blow mold for forming a plastic bottle having a radial flange suitable for roll-form attachment to a metal can end. The mold has a pair of confronting mold halves, each mold half including a body forming portion, a bottom pinch-off portion located below the body forming portion, a top block portion including a blow chamber located above the body forming portion, and a spin-ring forming portion located between the body forming portion and the top block portion. The spin-ring forming portion includes a thread ring insert and a cutter ring insert. The thread ring insert has an inside upper edge including an outwardly extending surface terminating in a step defining a lower surface and a outer edge of a radial flange. The cutter ring insert is positioned immediately above the thread ring insert. The cutter ring insert has a lower surface adjacent an inside edge defining an upper surface of the radial flange including a tapered inner edge extending upward and inward from the step. At least one of the thread ring insert and cutter ring insert includes a relief surface connected to a vent channel to permit gas to escape from the area defining the radial flange.

24 Claims, 6 Drawing Sheets

U.S. PATENT DOCUMENTS

| | | | |
|---|---|---|---|
| 6,629,623 B2 | 10/2003 | Nakamura et al. | 220/669 |
| 6,640,993 B2 | 11/2003 | Nakamura et al. | 220/669 |
| D512,917 S | 12/2005 | Frisch et al. | D9/516 |
| D528,861 S | 9/2006 | Herrera | D7/510 |
| 7,153,466 B2 | 12/2006 | Clougherty | 264/521 |
| D535,152 S | 1/2007 | Gluck | D7/523 |
| 7,178,687 B1 | 2/2007 | Manderfield, Jr. et al. | 220/675 |
| 2003/0090024 A1* | 5/2003 | Skov et al. | 264/157 |
| 2005/0287242 A1 | 12/2005 | Jarman et al. | 425/525 |

FOREIGN PATENT DOCUMENTS

| | | |
|---|---|---|
| EP | 1 563 984 A1 | 8/2005 |
| FR | 2086554 | 12/1971 |
| JP | 60151025 A * | 8/1985 |

\* cited by examiner

APPARATUS FOR EXTRUSION-BLOW MOLDING A BOTTLE FOR ASSEMBLY WITH METAL CAN END

BACKGROUND OF THE INVENTION

1. Field of the Invention

The present invention generally relates to extrusion-blow molding apparatus, and particularly to apparatus for molding plastic can bodies suitable for joining to metal can ends.

2. Description of the Prior Art

There are a number of processes available for making a plastic container having a wide-mouth suitable for combination with a metal can end using a typical double rolled seam. Wide-mouth stretch blow-molded PET containers are known that are designed to hold a pressurized contents, such as tennis balls. In such containers, it is desirable to have a high biaxial molecular oriented flange of desired strength and thickness extending radially outwardly from around the wide open mouth for receiving a metal end closure. Examples of such containers are disclosed in U.S. Pat. Nos. 4,496,064 and 4,576,843, which require complete biaxial molecular orientation for adequate performance. The patents disclose the formation of an intermediate article utilizing an oblique truncated cone type of accommodation area, including the flange portion surrounding the wide open mouth of the tubular body. The truncated cone shape imparts a gradual increase in biaxial molecular orientation from a neck area at the top to the flange portion at the bottom of the accommodation portion. The accommodation portion is then removed by cutting through the flange to provide a container having a flange around the open mouth with the desired biaxial molecular orientation. However, the design of the accommodation portion in the form of the oblique truncated cone makes it difficult to consistently control the degree of biaxial molecular orientation and the thickness of the flange material which often results in undesirable strength and thickness variations in the flange for receiving a metal end closure by double seaming operations.

Another example is disclosed in U.S. Pat. No. 4,894,268 in which an injection molded preform is blow molded into an intermediate article within a cavity having a flange forming feature in a region of the blown intermediate article that sufficient biaxial orientation of the polymer will take place. The flange extends around and radially outwardly from an upper open end of a tubular body portion of the intermediate wide mouth container article. The flange is a portion of an accommodation portion in the intermediate article which extends from the upper end of the tubular body portion and includes a flange of high biaxial molecular orientation. The flange is adapted to be annularly cut to remove the remainder of the accommodation portion during fabrication of the wide-mouth container from the intermediate article. A stepped wall portion of decreasing biaxial molecular orientation extends around and upwardly and inwardly from the flange and includes at least two successive upwardly and inwardly extending step means or areas for collecting a quantity of PET during blow-molding and for increasing biaxial molecular orientation and controlling the thickness of the flange More recently, U.S. Pat. No. 5,342,663 discloses the formation of a preform with an injection molded flange, which in subsequent molding operations, is not subjected to any biaxial stretch during the blow molding process performed on the remainder of the preform, thus maintaining its injected profile. The flange is said to have sufficient mechanical durability and non-gas-permeability to endure any subsequent double-seaming operation due to a flow orientation of plastic molding material, which is made to flow through a relatively narrow area. The flange is said to be precisely dimensioned, having mechanical durability to be double-seamed with a lid. The flange is disclosed to be preferably 0.3 mm to 0.7 mm thick.

The continued recognition of the importance of maintaining the precise dimensional uniformity of the flange, and the difficulty of achieving that uniformity in extrusion-blow molding processes, is reflected in U.S. Pat. No. 7,153,446, which disclosed an apparatus and process for molding a flange suitable for double seaming with a metal lid. The mold includes a circumferential groove that is filled with flowable thermoplastic material when the material is inflated in the mold. A localized region of the mold adjacent the groove is heated by a heating system to a higher temperature than other portions of the mold to render the thermoplastic less viscous so that the groove is completely filled. The heating system can be of various types, including electrical heaters, circulated hot fluid heaters, etc., and is locally disposed in the vicinity of the groove in the mold for heating the mold surfaces in the groove. The mold can also include a cooling system locally disposed in the vicinity of the groove for cooling the flange of the blow-molded article just prior to opening the mold and removing the article. The cooling system can comprise, for example, a circulated coolant system or the like. The manufacture of molds having such localized groove focused heating and cooling systems is expected to be more expensive than conventional molds having uniform heating or cooling systems. Additional controls are also required to control the localized groove focused heating and cooling systems beyond that conventionally required.

Thus, there remains a need for an extrusion blow mold capable of reliably forming a plastic bottle that includes a radial flange suitable for roll-form attachment to a metal can end that can be simply constructed and operated without extraordinary heating and control features.

SUMMARY OF THE INVENTION

An extrusion blow mold for forming a plastic bottle includes features that form a radial flange suitable for roll-form attachment to a metal can end without any different heating or cooling in the vicinity of the flange-forming features of the mold. The mold has a pair of confronting mold halves. Each mold half can include a body forming portion, a bottom pinch-off portion located below the body forming portion, a top block portion including a blow chamber located above the body forming portion, and a spin-ring forming portion located between the body forming portion and the top block portion. The spin-ring forming portion can include a thread ring insert and a cutter ring insert. The thread ring insert can have a radial inner surface and an inside upper edge including an outwardly extending surface terminating in a step defining a lower surface and an outer edge of the radial flange of the bottle. The cutter ring insert can be positioned immediately above the thread ring insert. The cutter ring insert can have a lower surface adjacent an inside edge defining an upper surface of the radial flange that can include a tapered inner edge extending upward and inward from the step. At least one of the thread ring insert and cutter ring insert can include a relief surface connected to a vent channel to permit gas to escape from the area defining the radial flange.

The cutter ring insert can include an inclined upper surface defining the lower surface of the molded spin-ring. The inclined upper surface of the cutter ring insert can intersect the tapered inner edge of the lower surface to define a radially innermost edge of the cutter ring insert, which can be positioned above and slightly outside the radial inner surface of the thread ring insert. The radially innermost edge of the cutter ring insert defines a groove immediately above the radial flange of the molded article that can facilitate a subsequent spin trimming of the spin-ring from the flange.

The relief surface can be situated on the upper surface of the thread ring insert confronting the cutter ring insert. The relief surface can also be situated on the lower surface of the cutter ring insert confront the thread ring insert. The relief surface can extend laterally over the majority of the arcuate extent of the insert. The relief surface can include a shallow relief portion immediately adjacent the step forming the radial outer surface of the molded flange. The relief surface can also include a deeper relief portion radially outside the shallow relief portion, the deeper relief portion including a volume of space much larger than the shallow relief portion. The volume of space provided by the relief surface facilitates the complete uniform filling of the flange of the molded article so that after trimming the molded article can be successfully joined to a metal can end, particularly a metal beverage can end, using conventional roll-form attachment processes.

Other features and advantages of the present invention will become apparent to those skilled in the art from the following disclosure of preferred embodiments of the present invention exemplifying the best mode of practicing the invention. The following disclosure references the accompanying drawings illustrating the preferred embodiments.

DESCRIPTION OF PREFERRED EMBODIMENTS

Figure 1:
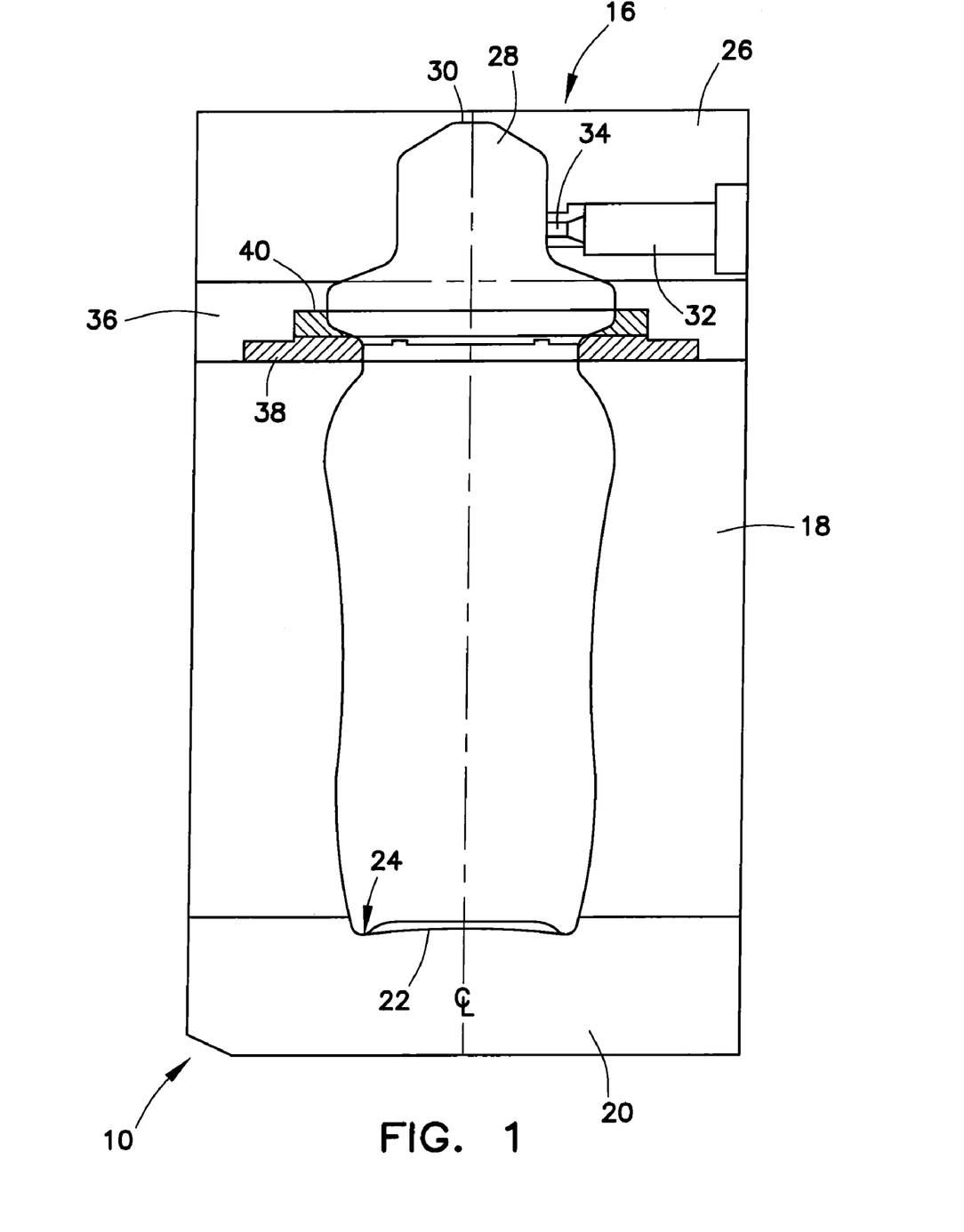
FIG. 1 is an interior side elevation view of one side of an extrusion blow mold designed to form a plastic bottle having features that form a radial flange suitable for roll-form attachment to a metal can end.
Figure 6:
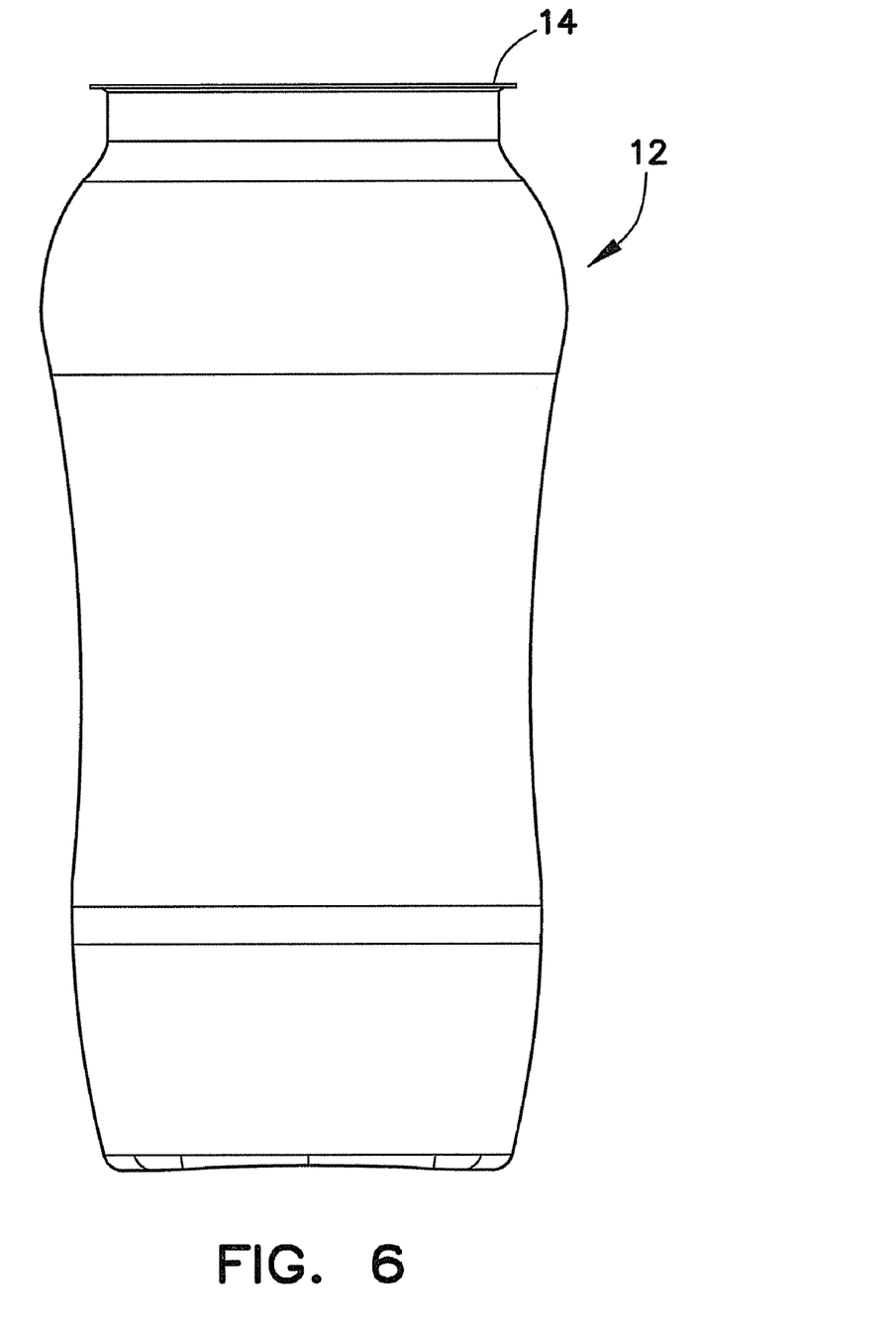
FIG. 6 is a side elevation view of a plastic bottle formed in the extrusion blow mold of FIG. 1 following spin trimming.

An extrusion blow mold 10 is shown in FIG. 1 that is suitable for forming a plastic bottle 12 shown in FIG. 6. The extrusion blow mold 10 includes features described in detail below that form a radial flange 14 suitable for roll-form attachment to a metal can end, particularly a conventional metal beverage can end, not shown. The mold 10 has a pair of confronting mold halves 16, only one of which is shown in FIG. 1. The two halves of the mold 10 are movable relative to each other in a known manner to an open position to receive an extruded tubular parison. The parison can formed from any of various suitable thermoplastic materials, including HDPE, LDPE, polypropylene, PVC, PET, polycarbonate, and others, or as a multi-layer structure which can include EVOH and/or Nylon. Once a parison has been inserted between the two halves 16, the mold 10 can be moved to a closed position where the confronting edges of the two mold halves 16 abut each other to form a continuous cavity.

Each mold half 16 has a body forming portion 18 that defines the exterior appearance of the finished bottle 12. In the illustrated embodiment, the body forming portion 18 includes several sections of different diameters and shapes to impart an aesthetically pleasing appearance to the finished bottle 12. However, body forming portion 18 of the mold, and hence the bottle 12, can be made to have various cross-sectional shapes that may be other than circular. Various parts of the body forming portion 18 can be straight, tapered, and/or contoured in various ways as desired. The invention is not limited to any particular shape and the bottle 12 is merely shown as a representative example for explanatory purposes.

Each mold half 16 has a bottom pinch-off portion 20 located below the body forming portion 18. The bottom pinch-off portion 20 includes an edge 22 that seals the lower end of the parison as the mold 10 is moved to the closed position. An inside surface 24 of the pinch-off portion defines the shape of the bottom of the finished bottle 12, which is again subject to some variation in appearance. Each mold half 16 can also have a top block portion 26 including a blow chamber 28 located above the body forming portion 18. The top block portion 26 can include a top edge 30 that seals the upper end of the parison as the mold 10 is moved to the closed position. A blow pin 32 can be provided in the blow chamber 28 having a tip 34 designed to penetrate the tubular parison as or after the mold 10 moves to the closed position. Air or other gas can be introduced through the blow pin 32 in a known manner to inflate the parison so that the parison expands outward to conform generally to the shape of the interior surface of the mold 10.

Each mold half 16 includes a spin-ring forming portion 36 located between the body forming portion 18 and the top block portion 26. The spin-ring forming portion 36 is used to form a spin-ring that facilitates a trimming operation that is performed subsequent to the molding of the bottle 12. The spin-ring forming portion 36 can include a thread ring insert 38 and a cutter ring insert 40 which together facilitate the formation of the radial flange 14 with sufficient precision that the radial flange 14 is suitable for roll-form attachment to a metal can end without any different heating or cooling in the vicinity of the flange-forming features of the mold 10. The thread ring insert 38 and a cutter ring insert 40 are shown in greater detail in FIG. 2.

Figure 2:
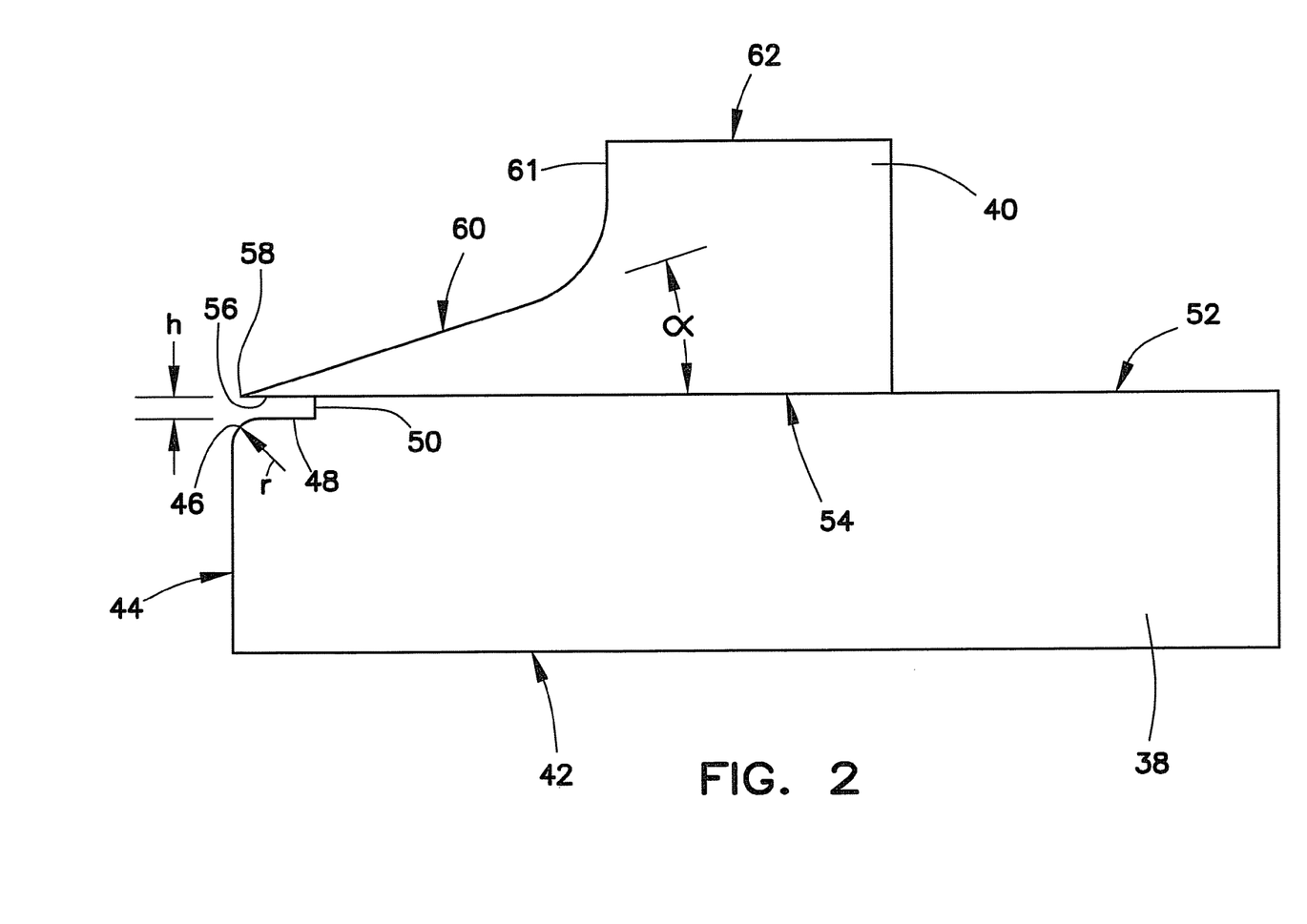
FIG. 2 is a sectional view of a thread ring insert and a cutter ring insert suitable for use in the mold of FIG. 1.

The thread ring insert 38 can have a lower surface 42 that can abut an upper end of the body forming portion 18. The thread ring insert 38 can have a radial inner surface 44 that defines the appearance of a neck portion of the bottle 12. An inside upper edge 46 of the radial inner surface 44 defines the junction of the neck portion of the bottle to the radial flange 14. The inside upper edge 46 can be defined by a small radius r, which can range from 0.001 in (0.025 mm) to 0.032 in (0.813 mm). In an illustrative example, the radius r was 0.025 in. (0.635 mm). An outwardly extending surface 48 of the thread ring insert 38 defines a lower surface of the radial flange 14. The outwardly extending surface 48 terminates in a step 50 that defines an outer edge of the radial flange 14 of the bottle 10. The height h of the step 50 also essentially defines the thickness of the radial flange 14. The radial flange 14 can have a uniform thickness of between 0.010 in (0.025 mm) and 0.040 in (0.102 mm). The radial flange 14 desirably has a uniform thickness that is no more than, and preferably less than, half the radial dimension of the flange. As shown, the radial length outwardly extending surface 48 is more than three times the height of the step 50. The distance between the radial inner surface 44 and the step 50 can range between 0.030 in (0.762 mm) and 0.150 in (3.810 mm). In an illustrative example, the distance between the radial inner surface 44 of the thread ring and the step 50 is 0.078 in (1.981 mm). A top surface 52 of the thread ring insert 38 extends outward from the top of the step 50.

The cutter ring insert 40 can be positioned immediately above the thread ring insert so that a bottom surface 54 of the cutter ring insert 40 abuts the top surface 52 of thread ring insert 38. The cutter ring insert 40 can have a lower surface portion 56 adjacent an inside edge 58 that defines an upper surface of the radial flange 14. The lower surface portion 56 can be tapered so as to extend upwardly and inwardly from the step 50. The angle of the taper is generally very small, typically less than about 3°. The cutter ring insert 40 can include an inclined upper surface 60 that defines the lower surface of the molded spin-ring. The surface 60 can be inclined at an angle $\alpha$ of between 10° and 30°. In a working example the surface 60 is inclined at an angle $\alpha$ of 18°. The inclined upper surface 60 of the cutter ring insert 40 can intersect the tapered lower surface 56 to define the radially innermost edge 58 of the cutter ring insert 40. The innermost edge 58 of the cutter ring insert can be positioned above and slightly outside the radial inner surface 44 of the thread ring insert 38. The radially innermost edge 58 of the cutter ring insert 40 defines a groove immediately above the radial flange 14 of the molded intermediate article that can facilitate a subsequent spin trimming of the spin-ring from the flange 14. The cutter ring insert 40 can include a substantially vertical surface 61 defining at least a portion of the outer perimeter of the spin-ring. A top surface 62 of the cutter ring insert 40 can abut a mating surface of the spin-ring forming portion 36.

Figure 3:
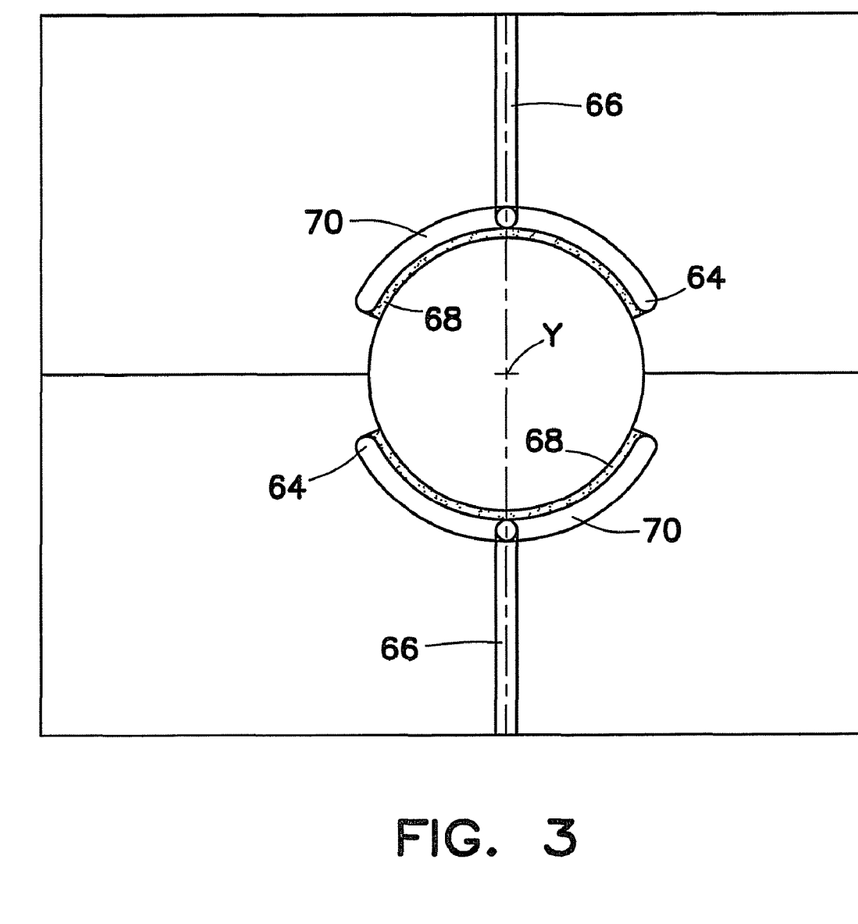
FIG. 3 is a top plan view of an opposed pair of thread ring inserts designed for use in the mold of FIG. 1 showing the relief surfaces formed to facilitate the escape of gas from the flange-forming portion of the mold.

The formation of the flange 14 is facilitated by the presence of a relief surface 64 shown in FIG. 3. The relief surface 64 can be located on either the thread ring insert top surface 52 or the cutter ring insert bottom surface 54, or on a combination of both surfaces 52 and 54. The relief surface 64 is connected to a vent channel 66 to permit gas to escape from the area defining the radial flange 14. The relief surface 64 can extend laterally over an arcuate range of between 45° and 175° of the insert 38 and/or 40 in each mold half 16. In the embodiment shown in FIG. 3, the relief surface 64 extends over about 130° of each insert as measured around axis Y. The relief surface 64 can include a shallow relief portion 68 immediately adjacent the step 50 forming the radial outer surface of the molded flange 14. The relief surface 64 can also include a deeper relief portion 70 radially outside the shallow relief portion 68.

Figure 4:
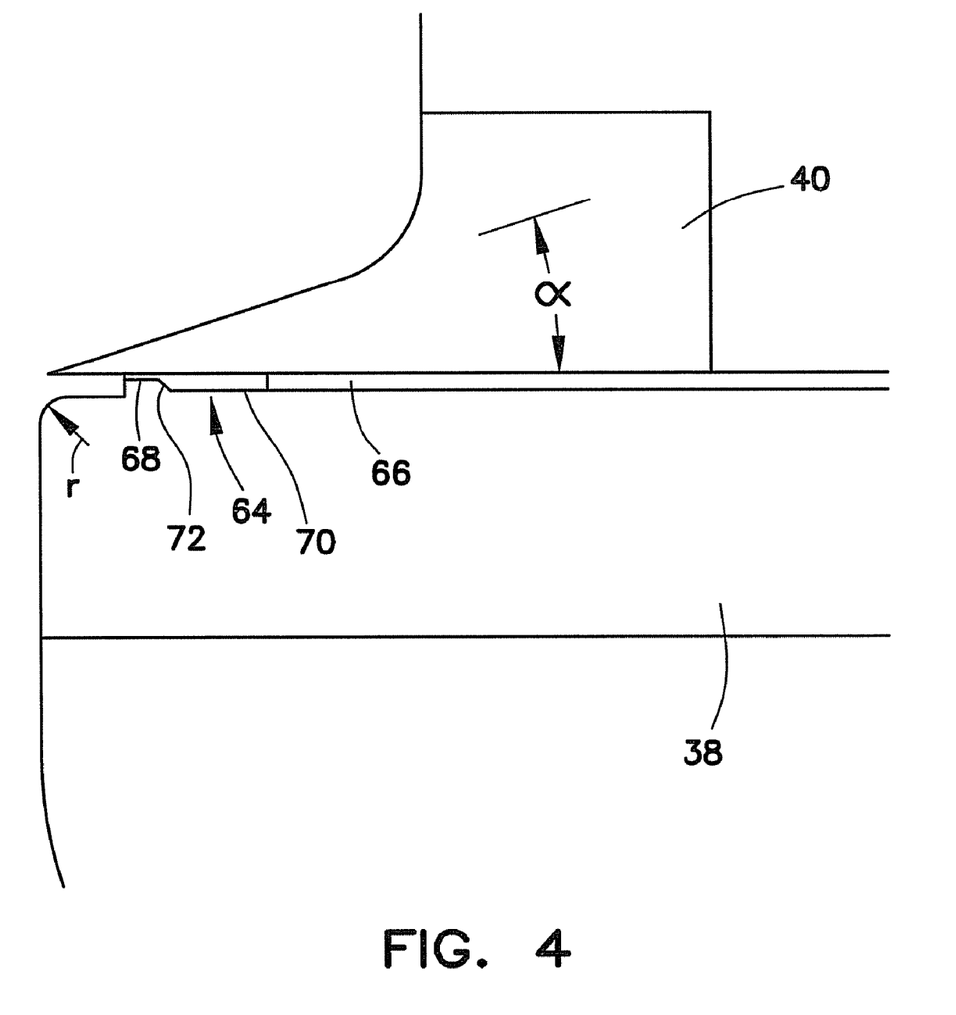
FIG. 4 is a sectional view of the thread ring insert and cutter ring insert as shown in FIG. 2 including a greatly enlarged schematic view of the relief surfaces shown in FIG. 3.

One possible cross-sectional shape for the relief surface 64 is shown schematically in FIG. 4. The vertical dimensions of the various portions of the relief surface 64 are greatly exaggerated in FIG. 4 to facilitate illustration of the features. As shown in FIG. 4, the deeper relief portion 70 includes a volume of space much larger than the shallow relief portion 68. A tapered surface 72 can be provided to connect the shallow relief portion 68 to the deeper relief portion 70. The vent channel 66 is preferably at least as deep as the deeper relief portion 70. The shallow relief portion 68 can define a vertical space between the thread ring insert 38 and the cutter ring insert 40 of between 0.001 in. (0.025 mm) and 0.004 in. (0.102 mm). The deeper relief portion 70 can define a vertical space between the thread ring insert 38 and the cutter ring insert 40 of between 0.005 in. (0.025 mm) and 0.050 in. (0.254 mm). The deeper relief portion 70 can be spaced from the step 50 by a distance of between 0.030 in. (0.762 mm) and 0.125 in. (3.175 mm).

In one example embodiment, the shallow relief portion 68 defines a vertical space of about 0.002 in. (0.051 mm) between the thread ring insert 38 and the cutter ring insert 40. In the same example embodiment, the deeper relief portion 70 defines a vertical space of about 0.030 in. (0.762 mm) between the thread ring insert 38 and the cutter ring insert 40. In the same example embodiment, the deeper relief portion 70 is spaced from the step 50 by about 0.060 in. (1.52 mm). The volume of space provided by the relief surface 64 and vent channel 66 facilitates the complete uniform filling of the space defining the flange 14 of the molded article so that after trimming the flange 14 can be successfully joined to a metal can end, particularly a metal beverage can end, using conventional roll-form attachment processes.

Figure 5:
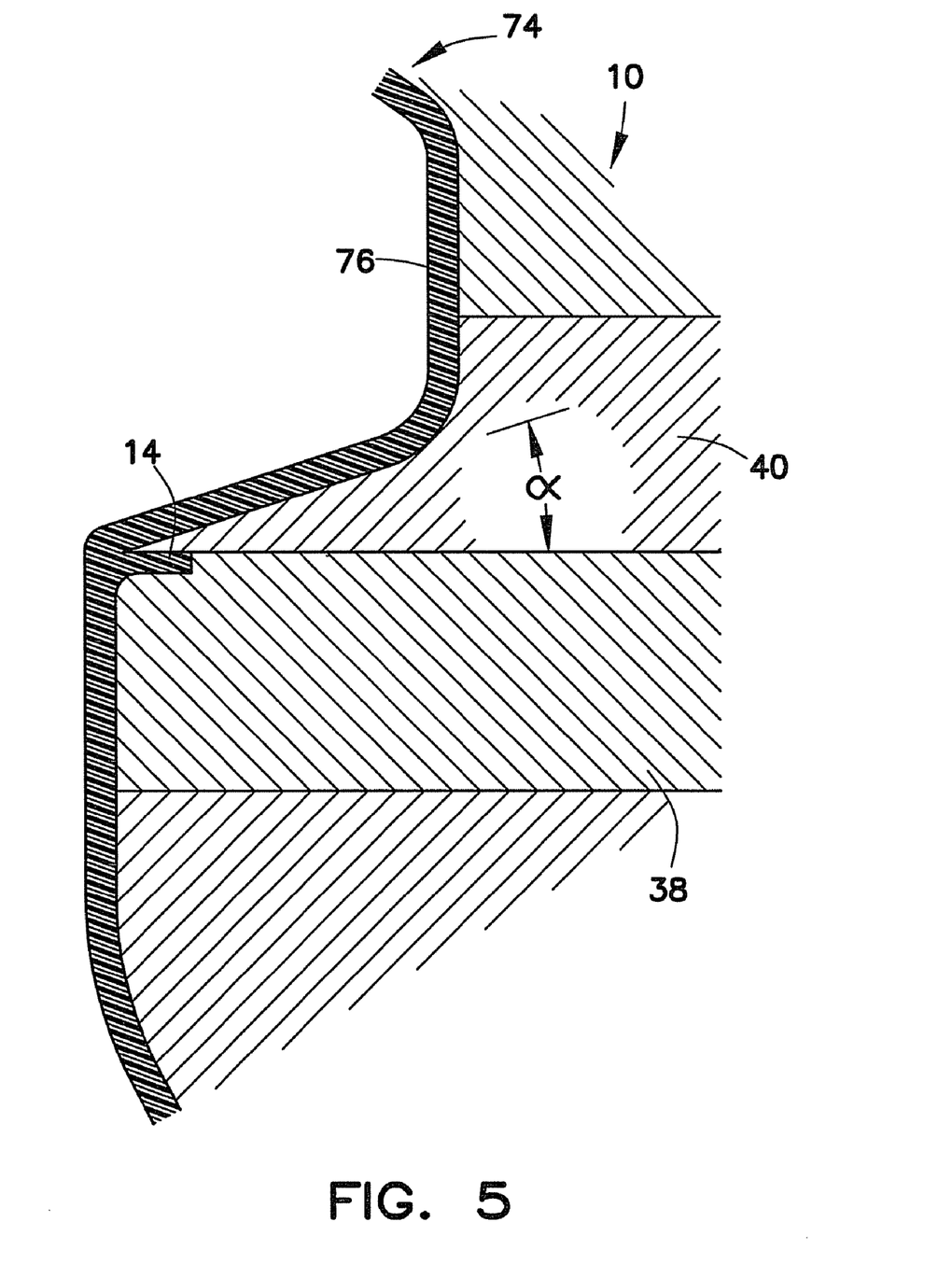
FIG. 5 is a sectional view of a portion of the extrusion blow mold similar to FIG. 2 showing a typical layer of plastic on the inside of the mold as a result of an extrusion blow-molding process.

A sectional view of a portion of the extrusion blow mold 10 is seen in FIG. 5 showing a typical layer of plastic on the inside of the mold 10 forming an intermediate article 74 including a spin-ring 76 as a result of an extrusion blow-molding process. The layer of plastic is substantially uniform although some variation in thickness can conventionally be observed as a function of the distance of the adjacent mold wall from the axis Y of the mold 10. The layer of plastic adjacent to the thread ring insert 38 is shown to be slightly greater than the vertical thickness of the flange 14, however such a thickness relationship in not required. The flange 14 is seen to be continuously filled with the plastic without any different heating or cooling in the vicinity of the flange-forming features of the mold 10 so that the flange is solid, not hollow. Following the extrusion blow molding of the intermediate article 74 shown in FIG. 5, the article is removed from the mold 10 and subjected to a conventional spin trimming operation during which the spin-ring 76 is trimmed from the bottle 12 at the top of the flange 14.

FIG. 6 shows a side elevation view of the resulting bottle 12 including the flange 14 suitable for roll-form attachment to a metal can end, particularly a metal beverage can end, which can be made in the mold 10 without any need for any differential heating or cooling in the vicinity of the flange-forming features of that mold. Again, the invention is not limited to any particular shape, and the bottle 12 is merely shown as a representative example for explanatory purposes.

From the forgoing description of the structure and operation of a preferred embodiment of the present invention, it will be apparent to those skilled in the art that the present invention is susceptible to numerous modifications and embodiments within the ability of those skilled in the art and without exercise of the inventive facility. Accordingly, the scope of the present invention is defined as set forth of the following claims.

What is claimed is:

1. An extrusion blow mold for forming a plastic bottle having a radial flange suitable for roll-form attachment to a metal can end without any different heating or cooling in the vicinity of the flange-forming features of the mold, the mold comprising:

a pair of confronting mold halves, each mold half including a body forming portion, a bottom pinch-off portion located below the body forming portion, a top block portion including a blow chamber located above the body forming portion, and a spin-ring forming portion located between the body forming portion and the top block portion, the spin-ring forming portion including a thread ring insert having an inside upper edge including a radially outwardly extending surface defining a lower surface of a radial flange, the spin-ring forming portion additionally including a cutter ring insert positioned immediately above the thread ring insert, the cutter ring insert including a lower surface adjacent an inside edge defining an upper surface of the radial flange including a tapered inner edge extending upward and inward from the step, at least one of the thread ring insert and cutter ring insert including a relief surface connected to a vent channel to permit gas to escape from the area defining the radial flange.

2. The extrusion blow mold of claim 1, wherein the thread ring insert upper edge additionally includes a step situated at an outer edge of the radially outwardly extending surface defining an outer edge of the radial flange.

3. The extrusion blow mold of claim 1, wherein a step is situated at an outer edge of the tapered inner edge, the step defining an outer edge of the radial flange.

4. The extrusion blow mold of claim 1, wherein the relief surface extends over only a portion of the area defining the radial flange.

5. The extrusion blow mold of claim 1, wherein the cutter ring insert has an innermost edge situated radially outside an innermost edge of the thread ring insert.

6. The extrusion blow mold of claim 3, wherein the relief surface includes a shallow relief portion immediately adjacent the step, and a deeper relief portion outside the shallow relief portion.

7. The extrusion blow mold of claim 6, wherein the radial dimension of the shallow relief portion is smaller than the deeper relief portion.

8. The extrusion blow mold of claim 6, wherein the deeper relief portion is connected to the vent channel.

9. The extrusion blow mold of claim 8, wherein the vent channel has a vertical dimension at least as large as the deeper relief portion.

10. An extrusion blow mold for forming a plastic bottle having a radial flange suitable for roll-form attachment to a metal can end without any different heating or cooling in the vicinity of the flange-forming features of the mold, the mold comprising:
a pair of confronting mold halves, each mold half including a body forming portion, a bottom pinch-off portion located below the body forming portion, a top block portion including a blow chamber located above the body forming portion, and a spin-ring forming portion located between the body forming portion and the top block portion, the spin-ring forming portion including a thread ring insert having an inner surface with an upper edge merging with a outwardly extending surface, the outwardly extending surface terminating in a step, the outwardly extending surface and step respectively defining a lower surface and a outer edge of said radial flange, the spin-ring forming portion additionally including a cutter ring insert positioned immediately above the thread ring insert, the cutter ring insert including a lower surface adjacent an inside edge defining an upper surface of the radial flange including a tapered inner edge extending upward and inward from the step, at least one of the thread ring insert and cutter ring insert including a relief surface connected to a vent channel to permit gas to escape from the area defining the radial flange.

11. The extrusion blow mold of claim 10, wherein the distance from the inner surface of the thread ring insert to the step is at least three times the height of the step.

12. The extrusion blow mold of claim 10, wherein the relief surface extends over an arcuate range of between 45° and 175° in each mold half.

13. The extrusion blow mold of claim 11, wherein the relief surface includes a shallow relief portion immediately adjacent the step, and a deeper relief portion outside the shallow relief portion.

14. The extrusion blow mold of claim 13, wherein the shallow relief portion defines a vertical space between the thread ring insert and the cutter ring insert of between 0.001 in. (0.025 mm) and 0.005 in. (0.127 mm).

15. The extrusion blow mold of claim 13, wherein the deeper relief portion defines a vertical space between the thread ring insert and the cutter ring insert of between 0.005 in. (0.025 mm) and 0.050 in. (0.254 mm).

16. The extrusion blow mold of claim 13, wherein the deeper relief portion is spaced from the step by a distance of between 0.030 in. (0.762 mm) and 0.125 in. (3.175 mm).

17. The extrusion blow mold of claim 10, wherein the inner edge of the cutter ring insert includes an inclined upper surface intersecting the cutter ring insert lower surface at a vertical angle of between 10° and 30°.

18. The extrusion blow mold of claim 10, wherein the inner edge of the cutter ring insert is situated between 0.001 in. (0.025 mm) and 0.050 in (0.254 mm) outside the inner edge of the thread ring insert.

19. The extrusion blow mold of claim 10, wherein the cutter ring insert lower surface adjacent to and radially inside the step is spaced above the thread ring insert upper edge by a distance of between 0.010 in. (0.254 mm) and 0.040 in. (1.016 mm).

20. The extrusion blow mold of claim 10, wherein the radius defining the thread ring inside upper edge is between 0.001 in. (0.025 mm) and 0.032 in (0.813 mm).

21. The extrusion blow mold of claim 10, wherein the distance between the radial inner surface of the thread ring and the step is between 0.030 in (0.762 mm) and 0.150 in (3.810 mm).

22. An extrusion blow mold for forming a plastic bottle having a radial flange suitable for roll-form attachment to a metal can end without any different heating or cooling in the vicinity of the flange-forming features of the mold, the mold comprising:
a pair of confronting mold halves, each mold half including a body forming portion, a bottom pinch-off portion located below the body forming portion, a top block portion including a blow chamber located above the body forming portion, and a spin-ring forming portion located between the body forming portion and the top block portion, the spin-ring forming portion including a thread ring insert having an inner surface with an upper edge merging with a outwardly extending surface, the outwardly extending surface terminating in a step, the outwardly extending surface and step respectively defining a lower surface and a outer edge of said radial flange, the spin-ring forming portion additionally including a cutter ring insert positioned immediately above the thread ring insert, the cutter ring insert including a lower surface adjacent an inside edge defining an upper surface of the radial flange including a tapered inner edge extending upward and inward from the step, a surface of the thread ring insert confronting the cutter ring insert including a relief surface connected to the step and to a vent channel to permit gas to escape from the area defining the radial flange.

23. The extrusion blow mold of claim 22, wherein the relief surface extends over only a portion of the area defining the radial flange, the relief surface including a shallow relief portion immediately adjacent the step, and a deeper relief portion outside the shallow relief portion, the deeper relief portion being connected to the vent channel.

24. The extrusion blow mold of claim 23, wherein the distance from the inner surface of the thread ring insert to the step is more than twice the height of the step.

* * * * *